United States Patent [19]

White

[11] 4,248,696
[45] Feb. 3, 1981

[54] FLOTATION SEPARATION OF GLASS FROM A MIXTURE OF COMMINUTED INORGANIC MATERIALS

[75] Inventor: William R. White, Pomona, Calif.

[73] Assignee: Occidental Research Corporation, Irvine, Calif.

[21] Appl. No.: 16,900

[22] Filed: Mar. 2, 1979

[51] Int. Cl.$^3$ .............................................. B03D 1/02
[52] U.S. Cl. ........................................ 209/1; 209/166
[58] Field of Search ............................ 210/37; 241/20; 209/166, 3, 9, 112

[56] References Cited

U.S. PATENT DOCUMENTS

| | | | |
|---|---|---|---|
| 2,059,552 | 11/1936 | Churchill | 210/37 R X |
| 2,208,172 | 7/1940 | Urbain | 210/37 R X |
| 2,559,529 | 7/1951 | Bauman | 210/37 R |
| 3,193,498 | 7/1965 | Platzel | 210/37 R X |
| 3,250,703 | 5/1966 | Levendusky | 210/37 R X |
| 3,420,773 | 1/1969 | Selmeczi | 210/37 R X |
| 3,842,002 | 10/1974 | Buari | 210/37 R X |
| 4,067,502 | 1/1978 | Maren | 241/20 |

FOREIGN PATENT DOCUMENTS 547907 10/1957 Canada .................................. 210/37 R

OTHER PUBLICATIONS

AIMME, Tech. Pub., No. 1902, Amine Flotation of Gangue from Magnetite Conc., Scott et al., pp. 1 & 6.
Acta Poly Technica Scandinavica, Series No. 66, Amine Flotation of Ore Minerals & Silicates, Lidström, 1967, pp. 96, 97.

Primary Examiner—Robert Halper
Attorney, Agent, or Firm—Christie, Parker & Hale

[57] ABSTRACT

Particulate glass values contained in a comminuted inorganic fraction are recovered by froth flotation in a substantially sulfate ion free aqueous flotation medium and an amine as the beneficiation reagent.

12 Claims, 2 Drawing Figures

FLOTATION SEPARATION OF GLASS FROM A MIXTURE OF COMMINUTED INORGANIC MATERIALS

BACKGROUND OF THE INVENTION

Immense and ever increasing amounts of solid trash, particularly of a municipal nature, are being generated each day. Disposal problems are growing with equal complexity. Conventional methods of refuse disposal, such as land fill or mere incineration, are becoming prohibitively expensive or creating serious pollution problems.

In particular, land fill areas are becoming fewer in number and further from the sites where the majority of the trash is generated and incineration, because of national concern over the problems of air pollution, is being looked at with ever increasing skepticism.

Municipalities are, therefore, turning to techniques for processing solid wastes to recover, for resale or reuse, the values contained therein. This reduces the problems of pollution and helps offset the cost of processing the trash.

A general method of processing trash involves segregating the organic matter from the inorganics which include metals, concrete, bricks, glass and the like.

The organics may be processed for recovery as saleable materials such as paper pulp and the balance pyrolyzed to form char and a gaseous stream containing chemicals, which may be condensed as saleable commodities, and char which has an economic value of its own.

With respect to the inorganic matter, ferrous materials may be separated magnetically prior to or following separation of the organics. The remaining inorganics are comminuted by crushing or grinding into particles of fine size. Some may be separated by screening and other by heavy media separations.

SUMMARY OF THE INVENTION

According to the present invention there is provided an improvement in a process for the separation of particulate glass from comminuted inorganic matter, particularly the substantially inorganic residue from municipal solid waste, by a beneficiation process which involves flotation of glass particles up to about 10 mesh, preferably up to about 20 mesh from the comminuted inorganic matter of comparable size. Flotation occurs in a flotation medium in which sulfate ions have been substantially removed and by using as the beneficiation flotation reagent an amine containing from about 8 to about 22 carbon atoms in at least one hydrocarbon group attached to a nitrogen. The preferred amines are the primary and secondary amines. The recovery of glass using this flotation process is enhanced by the removal of sulfate ions from the flotation medium.

The process involves, in general, forming a mass of particulate inorganic matter containing crushed particulate glass obtained, for instance, as a consequence of the several crushing and grinding operations attendant to the processing of municipal solid wastes for recovery of the values contained therein and which, in any instance, include particles which are non-responsive to the beneficiation action of the amine to cause the particulate glass particles to concentrate in the float fraction.

The inorganic fraction may be treated as such if the glass has already been reduced to a particle size less than about 10 mesh, preferably less than about 20 mesh or generally passed through one or more additional comminuting operations to achieve a further reduction in size of the glass particles.

While other inorganics of larger particle size may be present, the mass of particulate inorganic matter is then generally screened or classified to separate out most of the metals and other inorganic residues having a particle size greater than the desired mesh size. That component of the inorganic matter which passes through the initial screening or classifying operation if not subjected to flotation as such is deslimed and classified to remove the particles having a size smaller than a minimum preselected mesh size, and the balance processed for the recovery of particulate glass by conventional beneficiation operations using an amine glass flotation reagent. The preferred minimum mesh size is about 325 mesh and more preferably 200 mesh.

While an amine or a mixture of amines may be used alone as the glass flotation reagent, the reagent, for reasons of economy, may be extended using conventional hydrocarbon extenders such as kerosene, mineral oil, fuel oil and the like. In addition, there may be included frothers which aid in the formation of a foam such as pine oil, methyl isobutyl carbinol, methyl glycol ether and the like, as are generally known to the art.

Sulfate ion is removed from the flotation medium to prevent the sulfate ion from reacting with the amine flotation reagents. If the sulfate ion is not removed it can react with and precipitate the amine reagent thereby decreasing the available amount of reagent with which to float the glass. It has been found that even small amounts of sulfate ions, such as less than 500 ppm, have a deleterious effect on the efficiency of the amine flotation process. Further, by removing the sulfate ion from the aqueous flotation medium the flotation reagent is preserved and therefore less reagent is required.

In a continuous operation of such a flotation process wherein the flotation medium is continuously recycled, the flotation medium can be passed through an anion exchange column for removal of the sulfate ions which may have been solvated from the comminuted particulate matter. Following the anion exchange treatment of the flotation medium such a sulfate ion free flotation medium can be utilized to float additional glass particles.

A most unique feature of applying flotation separation of particulate glass particles from the particulate mass of inorganic matter is the comminuted residue of bricks, crushed stone and cementitious matters remains with the residual inorganic tailing rather than becoming part of the float fraction. Had heavy media separations been employed, these constituents would have been combined with the glass along with the lighter metals limiting, as a consequence thereof, the economic value of the glass recovered and the end uses to which it may be applied.

DESCRIPTION

According to the present invention there is provided a process for the separation of particulate glass from a mass of generally inorganic matter which may be formed as a consequence of the treatment of municipal solid wastes for recovery of values contained therein.

The practice of the process of this invention relates to the selective flotation of particulate glass from a comminuted inorganic material including glass particles to a size less than about 10 mesh, preferably less than about 20 mesh. Such a process for the flotation of particulate glass is taught by U.S. Pat. No. 4,067,502 to Morey and White, which is incorporated herein by reference. More expeditiously the particles subjected to flotation are in the range of about 325 mesh to about 20 mesh, preferably from about 200 to about 20 mesh, and more preferably from about 150 to about 28 mesh. Formulation of the particles for flotation may be by a combination of screening, comminuting and desliming operations. The glass is then separated from the mass of inorganic matter of a similar particle size by a flotation process using as the flotation reagent at least one amine containing a hydrocarbon having from about 8 to about 22 carbon atoms, in at least one hydrocarbon group attached to a nitrogen atom as the selective flotation reagent for the glass particles. The preferred amines are primary amines and secondary amines with primary amines being particularly preferred.

Figure 1:
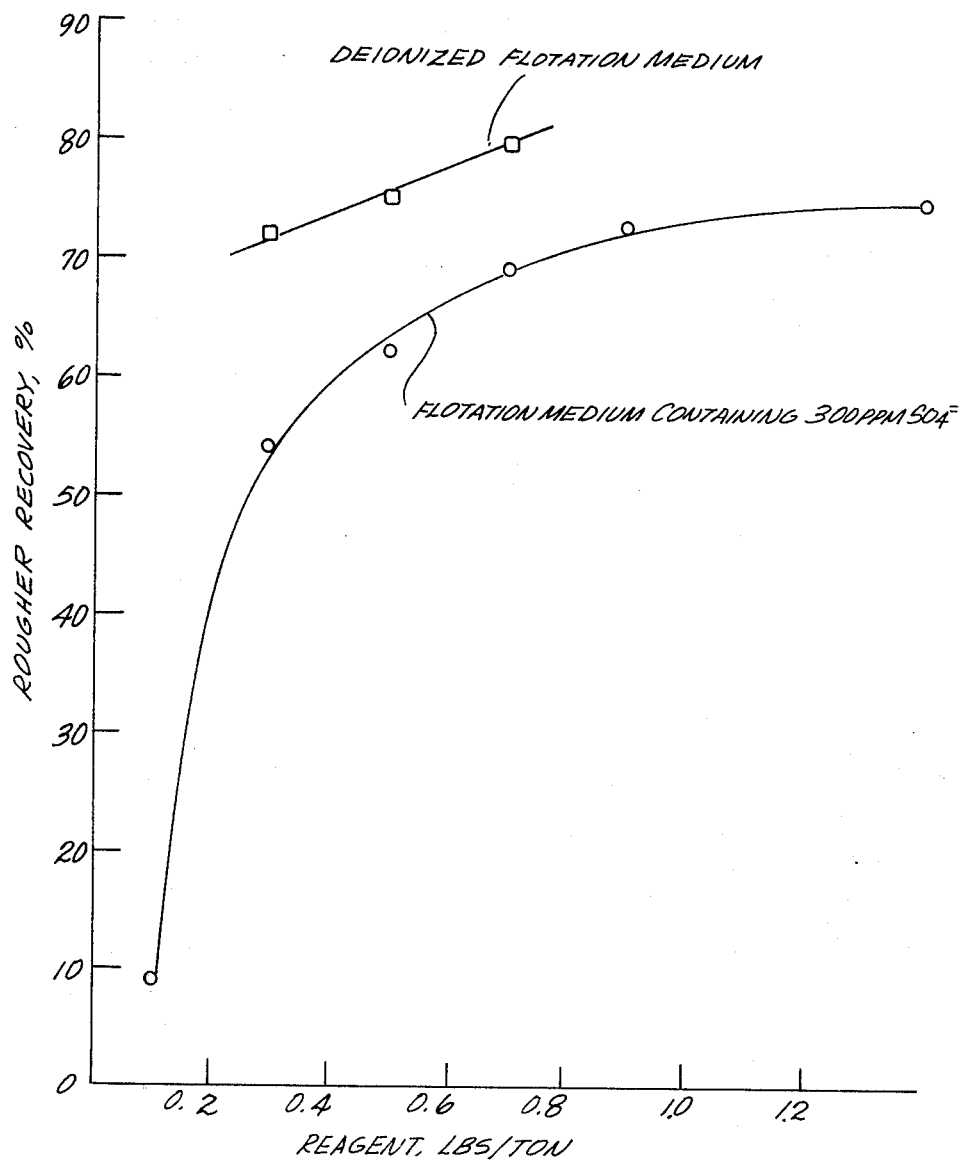
FIG. 1 represents a graph of the percent recovery of glass in a rougher float versus the concentration of flotation reagent used in pounds per ton at a constant sulfate concentration of 300 parts per million (ppm)
Figure 2:
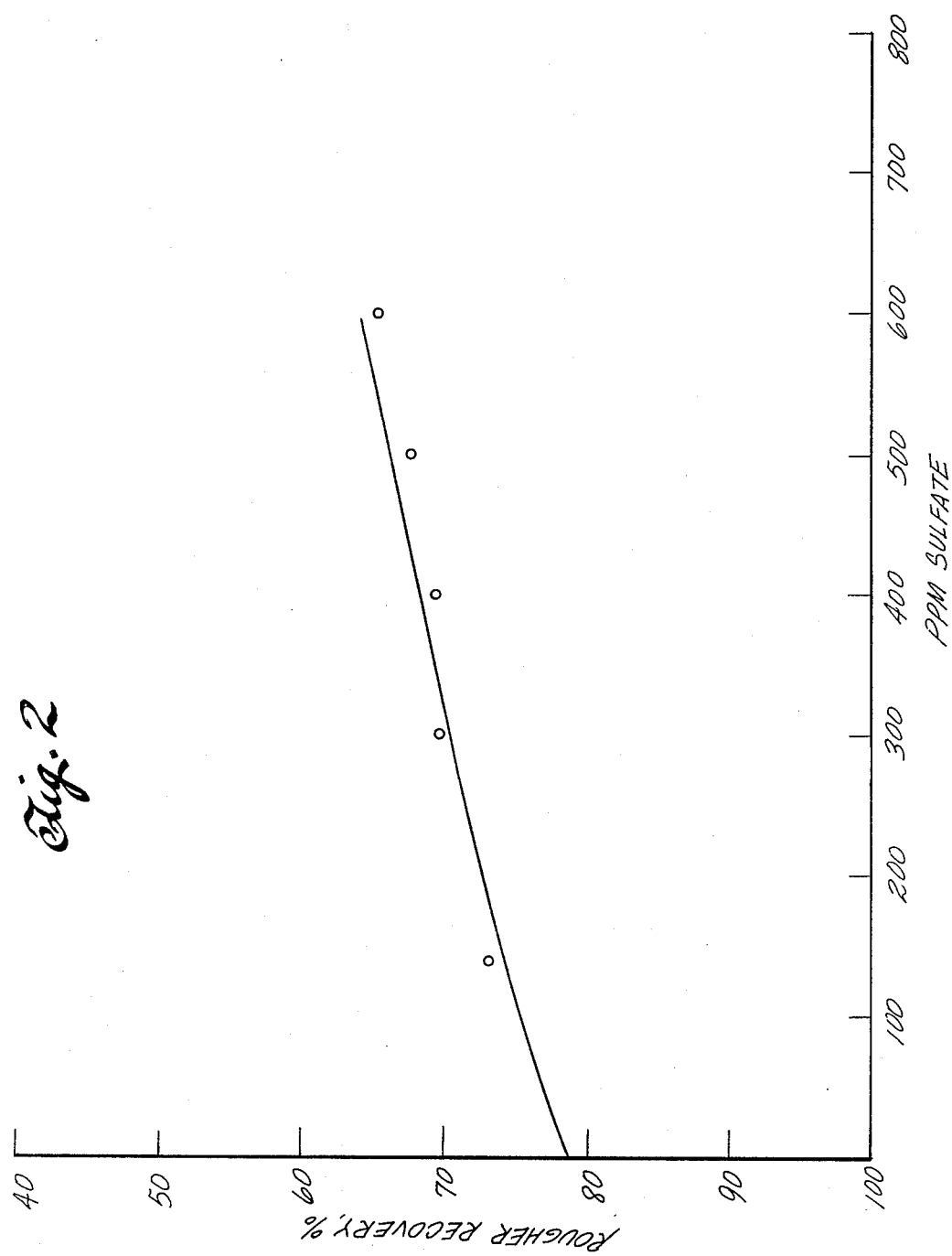
FIG. 2 represents a graph of the percent recovery of glass in a rougher float versus increasing sulfate concentration at a constant flotation reagent concentration.

The flotation medium employed is substantially free of sulfate ions. The benefit of the flotation medium being substantially free of sulfate ions is shown by FIGS. 1 and 2 when even as small an amount as 150 ppm can decrease the effectiveness of the flotation reagent by about 10 percent. It is preferred that the sulfate ion content in the flotation medium be less than about 100 ppm. Such a medium can be prepared from distilled or deionized water or by passing the medium once prepared through an anion exchange resin. An anion exchange resin can also be employed for the treatment of the flotation medium before the flotation medium is recycled to a subsequent flotation step for removal of any sulfate ions that were solvated from such comminuted inorganics during a previous flotation operation. The employment of an anion exchange column provides for a continuous flow of flotation medium which can be recycled for reuse in subsequent flotation of glass. Methods for sulfate ion removal that are conducted in batch methods, although useful and encompassed by the method of this invention, are less preferred.

Typical of the glasses to be principally beneficiated in accordance with this invention are common bottle or container glass, window or plate glass and incandescent lamp envelopes. They are generally known as soda-lime glasses. The analysis of such glasses is from about 70 to about 73 percent by weight $SiO_2$, from 11 to about 18 percent by weight $Na_2O$, from about 7 to about 17 percent by weight CaO, the remainder essentially being other metal oxides as colorants and the like. Included in the calcium oxide analysis is magnesium oxide $Mg_2O$, a substitute for calcium oxide to reduce cost and may be present in an amount of from about 3 to about 5 percent by weight based on the total weight of the glass. The most common species is formed from a mixture of about 72 percent by weight silica, about 15 percent by weight soda, about 10 percent by weight lime and magnesia, about 2 percent by weight alumina and about 1 percent by weight miscellaneous oxides.

The amine flotation reagents which may be used in accordance with the present invention, are not narrowly critical, and are generally obtained by the reaction of a lower molecular weight amine with a straight or branched chain alkane; a saturated or unsaturated or hydroxylated fatty acid or a hydrocarbon containing additional secondary or tertiary amine groups. Salts of the amines may be used including quaternary ammonium salts.

Illustrative but no wise limiting of the primary amines which may be used as selective flotation reagents for the separation of particulate glass from a comminuted mass of inorganic matter, there may be mentioned tallowamine acetate; N-hexadecylamine acetate; N-octadecylamine acetate; laurylamine acetate; primary amines derived from cocoa fatty acids, tallow fatty acids, soya fatty acids, castor fatty acids, oleylamine acetate; dihydroabietyl amine; primary tallow amine hydrochlorides, cottonseed oil amine hydrochloride, N-oleyl-1,3-propylene diamine; N-tall oil-1,3-propylene diamine; N-tallow oil-1,3-propylene diamine, N-cocopropylene diamine, N-laurylpropylene diamine, and the like.

Illustrative but no wise limiting of the secondary amines which may be used as flotation reagents in accordance with the practice of this invention there may be mentioned the condensation products of tall oil and diethylene triamine, dicocoamine, dilaurylamine, dihydrogenated tallowamine, dioctylamine, and the like.

Useful tertiary amines include the reaction products of tall oil and N,N dimethyl-propylene diamine, tricocoamine, trilaurylamine, trioctylamine, lauryldimethylamine, and the like.

As useful quaternary ammonium salts there may be mentioned dodecyl benzyl dimethyl ammonium chloride, octyl trimethyl ammonium chloride, lauryl colamino formyl methyl pyridinum chloride and the like.

The amines may generally be used over a pH range from about 5 or less to about 10 or more depending on the amine. Neutral conditions are preferred.

The amount of amine required to achieve effective separation of particulate glass from a generally grouping inorganic matter is not narrowly critical and will depend in part upon the glass content of the grouping of particle size as well as whether an extender and/or a frothing agent is used in combination with the amine. Other conditions being constant, the removal of sulfate ions from the flotation medium increases the amount of amine reagent that can interact with the glass and, as a consequence, reduce the amount required to achieve a degree of separation.

For the run of the mill, finely divided inorganic residue which may be found as the tailing from the treatment of solid wastes, there may be employed from about 0.15 lb. to about 2 lbs. of amine per ton of finely divided inorganic matter, preferably from about 0.5 lb. to about 2 lbs. per ton.

As indicated, there may be used with the amine an extender which serves, in general, to reduce the cost of the collector reagent used in the beneficiation flotation operation, particularly where the selected amine is fairly high in cost. Extenders used are generally conventional to the art and include among others, kerosene, fuel oil, mineral oil, bunker C oil, Stoddard's solvent and the like. When employed, the extender is normally present in the amount of from about 0 to about 3 lbs. per ton of inorganic residue.

Although not necessary to the practice of the process of this invention, there may be included conventional frothing aids such as pine oil, methyl-isobutyl carbinol, 2-ethyl-isohexanol, methyl amylalcohol, polypropylene glycol and methylglycolether and the like.

In general, the amount of frothing agent which may be included in the flotation system may range from 0 to about 0.5 lbs. per ton of the inorganic residue processed.

While the process of this invention may be applied for the flotation separation of particulate glass from any finely divided aggregate of inorganic matter, it will be particularly described in terms of treatment of the tailings of a process for recovery of values from solid wastes. While a generalized operation will be described below, a detailed description of a preferred process is described in U.S. Pat. No. 4,077,847 to Choi et al which is a glass discovery operation described in U.S. Pat. No. 4,070,273 to Morey, both incorporated herein by reference.

An alternate operation may begin by separating large paper stock by elutriation prior or subsequent to separation of the ferrous materials by conventional magnetic separation means. Independent of whether these preparatory operations are carried out, the balance of the trash is normally comminuted using conventional crushing and grinding operations and classified into an organic fraction and inorganic fraction.

Some portion of the organic fraction is generally formed into paper pulp for resale and the balance of residue pyrolyzed to form char and a gaseous stream containing recoverable chemicals.

As indicated, magnetic separation is generally employed at some point to separate from the waste ferrous materials which are, in turn, processed by various means to maximize the scrap value of the ferrous materials.

What generally follows is a series of comminuting, crushing and screening operations including the possibility of treatment with chemical reagents to recover, to the extent possible, the remaining metallic constituents such as copper, aluminum, brass and the like.

Soft metals, for instance, may be flattened as a consequence of crushing of the more friable materials and recovered by screening operations.

As more and more of the contained values are recovered by crushing, screening and heavy media separations, a finer residue of inorganic materials generally remains.

One of the more difficult constituents of this inorganic residue to separate as a clean fraction is glass. Glass is normally crushed to a fine state along with bricks, rock, concrete and similar cementitious materials in the several operations carried out during the processing of waste solids for the initial recovery of valuable metals. This residue may contain a variety of materials ranging from crushed metal particles which have eluded the separations, crushed brick, rock, concrete and glass and even egg shells which form a generally nondescript inorganic tailing fraction.

An initial separation of a fraction containing particulate glass from the balance may be made by a screening operation. To achieve flotation in accordance with the practice of this invention, it is preferred to employ screening operations which will eventually pass particles containing the glass and be finer than about 10, preferably about 20 mesh. If there has been incomplete crushing of the glass particles prior to this stage additional finer comminution operations may be employed to further reduce particle size.

An initial screening operation may, for instance, be employed to separate a good portion of the sand, dirt and miscellaneous solids having a particle size greater than the selected upper mesh size. The inorganic residue remaining and containing the glass particles may also be subjected, if desired, to heavy media separation wherein materials having a density equal to, or less than, the materials of a density greater than the media are floated off by merely filling a vessel containing the nondescript inorganic residue with the heavy media to an overflowing state such that the heavy media will carry away from the denser inorganic materials, glass materials and other materials of equivalent or lower density. This, as indicated, has proven to be an unsatisfactory separation where it is desired to free the glass fraction of comminuted brick and other cementitious materials. That resultant agglomerate finding only limited utility as "glasphalt" for road repairs.

There is, therefore, carried out in accordance with the practice of this invention, a process for providing a glass fraction which is essentially free of other materials. As previously indicated, the first stage is to form an inorganic fraction having a particle size less than about 10 mesh, preferably 20 mesh. This fraction may then be deslimed and classified to form a mixture comprising particles of greater than about 325 mesh, preferably greater than 200 mesh, and more preferably greater than about 150 mesh. If secondary separation occurs, the fines are removed from the system as a slime and discarded.

In particular, the inorganic fraction containing the crushed glass can be prepared by initially feeding the inorganic residue containing the glass to a crushing device which uses a compressive action rather than shear functions to achieve compaction of the softer metals for screening. Examples of such comminution devices include gyratory crushers, cone crushers, roll crushers, rod mills, jaw crushers and the like. The use of a rod mill for both the flattening and grinding operations is especially effective.

Friable or brittle materials, including any large glass particles, are broken into small fragments which pass through the screening operations while the more ductile materials are flattened for separation by screening. Where heavy metals are present, fine crushing is preferred to coarser crushing or extensive grinding.

After the desliming operation, the inorganic residue which has the select particle size or particle size range is then passed to a conventional flotation cell where there is added a beneficiating amount of at least one amine with or without an extender and/or a frothing agent in a suitable sulfate ion-free aqueous flotation medium, such as deionized water or water which has passed through an anion exchange column to remove the sulfate ions to cause froth flotation of the glass. The glass fraction may be characterized by the substantial absence of finely crushed brick, rock and cementitious materials but may contain magnetic materials. This fraction may be passed through additional flotation separation procedures to achieve an even finer purification of the glass fraction, the inorganic residue which remains after each froth flotation is either processed for recovery of values contained therein or discarded. If there is carried over with the glass ferromagnetic materials as slag, the slag can be separated from the glass by a conventional magnetic separator.

Any organics present, depending on whether they are water wet, may appear in the float or the tailing. Extremely light particles such as mica and talc will appear in the float as will particles responsive to the amine reagent. The tailings will contain particles which are non-responsive to the amine reagent as well as particles for which the amine is less selective as compared to glass.

The glass particles in the float are separated from the flotation medium by any convenient means and the flotation medium can be treated for removal of sulfate ions. The flotation medium is passed through an anion exchange column wherein the sulfate ion is absorbed on the column by the anion exchange resin in exchange for a non-deleterious anion such as a hydroxyl ion. It is not necessary to totally deionize the flotation medium, only the sulfate ions need be removed. When water was used as a flotation medium wherein only the sulfate ions had been removed, the glass flotation recoveries were substantially equivalent to glass flotation recoveries conducted in a deionized water flotation medium.

A particular advantage of the process of this invention is that the percentage recovery of glass per concentration of amine reagent increases when the sulfate ions are removed from the flotation medium.

EXAMPLE 1

A study was conducted to determine the effect of sulfate ions on glass flotation wherein glass was floated by the use of an amine flotation reagent.

Flotation runs were conducted in a Wemco laboratory cell at 1350 rpm, a pH of 7.5, utilizing 1000 grams of particulate feed of a municipal solid waste that had been twice deslimed and comminuted to a paticle size of −20 to +325 mesh. The amine flotation reagent used to float the particulate glass was a 1:1 mixture of Armac C and Armac T fatty amine acetates which are trademarks of Armour Industrial Chemicals Company for technical grade mixtures of fatty amine acetates derived from tallow fatty acids.

The sulfate ion concentration in the various flotation runs was held constant at 300 parts per million.

Three flotation runs were conducted using deionized water as the flotation medium as a control for determining the effect of sulfate ions on the flotation and recovery of the particulate glass.

The results of the flotation runs are shown in FIG. I. The presence of the sulfate ions was shown to reduce the amount of recovery of glass by flotation utilizing an amine flotation reagent. Further, the results show that when sulfate ions are present more amine flotation reagent is required to increase recovery of glass.

EXAMPLE 2

A study was conducted to determine the effect of sulfate ions on glass flotation wherein glass was floated by the use of an amine flotation reagent.

Flotation runs were conducted in a Wemco laboratory cell at 1350 rpm, a pH of 7.5, utilizing 1000 grams of particulate feed of a municipal solid waste that had been twice deslimed and comminuted to a particle size of −20 to +325 mesh. The amine flotation reagent used to float the particulate glass was a 1:1 mixture of Armac C and Armac T fatty amine acetates which are trademarks of Armour Industrial Chemicals Company for technical grade mixtures of fatty amine acetates derived from tallow fatty acids.

The amine flotation reagent concentration in the various flotation runs was held constant and the concentration of sulfate ions in the flotation medium was varied.

The results of the flotation runs are shown in FIG. II. The results indicate that small quantities of sulfate ions can affect the recovery of glass by flotation using an amine flotation reagent. When there is present in the flotation medium about 150 ppm sulfate ion there can be about a 10% loss of glass recovered. When there is about 600 ppm sulfate ion present in the flotation medium there is about a 19% loss of glass recovered.

EXAMPLE 3

A large quantity of a dry inorganic fraction obtained in the processing of municipal wastes and containing glass fragments is comminuted in a cone crusher adjusted to yield a finely ground product. Over 99% of the glass and the brittle material formed passes through a 3 mesh screen which, in turn, retains about 70% of the metals in the original inorganic fraction. The metallic content of the fraction which exceeds 3 mesh is found to exceed 95%.

The balance of the inorganic fraction is screened at 28 mesh and the portion coarser than 28 mesh in size is ground in a ball mill until at least the balance of the glass is finer than 28 mesh. The reground inorganic material is again screened with a 28 mesh screen and the material which passes through is combined with the material which originally passed by the 28 mesh screen.

The portion having a particle size exceeding 28 mesh is combined with metals exceeding 3 mesh. The resultant coarse mixture is found to be 90% metallic.

The inorganic fraction which is finer than 28 mesh is deslimed and classified to remove materials finer than 150 mesh and the −28 to +150 mesh matter is conditioned in a conventional froth flotation operation using as the flotation reagent a secondary amine which is the reaction product of tall oil and diethylene triamine. The amount employed is equivalent to 0.5 lbs per ton of particulate inorganic matter. Included with the amine is kerosene in an amount equivalent to 1 lb per ton of crushed inorganic matter and pine oil as a frother. The pH of the system is essentially neutral.

After treatment in a conventional manner for 20 seconds the glass floats off. The glass fraction is then recycled after removing the inorganic tailing to form a cleaner fraction by repeating the flotation operation. The purity of the glass is further improved by magnetic separation of contained ferromagnetic materials and is directly suitable for use in forming glass objects and vessels.

The flotation medium is separated from the particulate glass. The flotation medium is then passed through an ion exchange column containing an anion exchange resin which removes substantially all of the sulfate ions present in the flotation medium. The flotation medium is then recycled to the initial flotation operation to make a continuous flotation process for the recovery of glass.

EXAMPLE 4

A dry inorganic fraction obtained in the processing of municipal wastes and containing glass fragments is comminuted in a rod mill for 45 minutes. Over 99% of the glass and most of the brittle material in the ground product passes through an 8 mesh screen, which retains about 75% of the metals in the original inorganic fraction. The metallic content of the fraction which exceeds 8 mesh is about 85% metals, and the balance stones plus some plastic, wood, and minor glass fragments.

The balance of the inorganic fraction is screened at 32 mesh (Tyler) and a portion coarser than 32 mesh is reground to pass 32 mesh. The inorganic fraction which is finer than 32 mesh is classified and deslimed to remove the material finer than about 200 mesh, and the 32 to 200 mesh material is conditioned with Armeen C(TM), a primary cocoamine manufactured by Armour Industrial Chemicals Company in an amount equivalent to about 0.3 lb/ton of solids. The pH of the system is essentially neutral. After conditioning, the glass and amine together in a 25% solids slurry is floated off in a conventional manner for 5 minutes. The floated glass is recleaned in another flotation step with no additional reagents being added. After drying, ferromagnetic impurities are removed with an induced roll magnetic separator.

The flotation medium is separated from the particulate glass. The flotation medium is then passed through an ion exchange column containing an anion exchange resin which removes substantially all of the sulfate ions present in the flotation medium. The flotation medium is then recycled to the initial flotation operation to make a continuous flotation process for the recovery of glass.

While the process of this invention has been described primarily in terms of obtaining a pure glass fraction by flotation during the processing of solid wastes, it will be appreciated by one skilled in the art that the process may be employed for obtaining a pure glass fraction from many mixtures of glass and generally inorganic matter by using an amine flotation reagent and by removing any sulfate ions present or which become present in the flotation medium.

What is claimed is:

1. A process for separating particulate glass particles from a particulate mixture of inorganic materials containing such particulate glass particles which comprises subjecting a particulate mixture of substantially inorganic materials, including particles of size up to about 10 mesh and containing, as a portion thereof, a quantity of particulate glass particles comprising glasses having the composition of from about 70 percent to about 73 percent by weight $SiO_2$, from about 11 percent to about 18 percent by weight $Na_2O$, from about 7 percent to about 17 percent by weight CaO, the balance of the composition being essentially other metal oxides, to froth flotation in a substantially sulfate ion free aqueous flotation medium with a beneficiating amount of at least one functional amine glass collector reagent, said functional amine glass collector reagent containing from about 8 carbon atoms to about 22 carbon atoms in at least one hydrocarbon group attached to a nitrogen atom to form a float fraction comprising predominantly particulate glass particles and an inorganic tailing substantially free of particulate glass particles, at least a portion of said particulate mixture of substantially inorganic materials, exclusive of the particulate glass particles which are responsive to such a beneficiating amount of said functional amine glass collector reagent, being non-responsive to such a beneficiating amount of said functional amine glass collector reagent to cause the particulate glass particles to concentrate in the float fraction.

2. A process as claimed in claim 1 wherein the aqueous flotation medium is made substantially sulfate ion free by subjecting the aqueous flotation medium to the action of an ion exchange column containing an anion exchange resin capable of removing sulfate ions from the aqueous flotation medium.

3. A process as claimed in claim 1 wherein the sulfonate ion content of the substantially sulfate ion free aqueous flotation medium is less than about 100 ppm.

4. A continuous process for separating particulate glass particles from a particulate mixture of inorganic materials containing such particulate glass particles which comprises subjecting a particulate mixture of substantially inorganic materials, including particles of a size between about 325 mesh and about 28 mesh and containing, as a portion thereof, a quantity of particulate glass particles comprising glasses having the composition of from about 70 percent to about 73 percent by weight $SiO_2$, from about 11 percent to about 18 percent by weight $Na_2O$, from about 7 percent to about 17 percent by weight CaO, the balance of the composition being essentially other metal oxides, to froth flotation in a substantially sulfate ion free aqueous flotation medium with a beneficiating amount of at least one functional amine glass collector reagent, said functional amine glass collector reagent containing from about 8 carbon atoms to about 22 carbon atoms in at least one hydrocarbon group attached to a nitrogen atom to form a float fraction comprising predominantly particulate glass particles and an inorganic tailing substantially free of particulate glass particles, at least a portion of said particulate mixture of substantially inorganic materials, exclusive of the particulate glass particles which are responsive to such a beneficiating amount of said functional amine glass collector reagent, being non-responsive to such a beneficiating amount of said functional amine glass collector reagent to cause the particulate glass particles to concentrate in the float fraction.

5. A process as claimed in claim 4 wherein the aqueous flotation medium is treated to remove sulfate ion by passing the aqueous flotation medium through an ion exchange column containing an anion exchange resin capable of removing sulfate ions from the aqueous flotation medium.

6. A process as claimed in claim 4 wherein the substantially sulfate ion free aqueous flotation medium contains less than about 100 ppm sulfate ion.

7. A process for separating glass from a glass containing particulate mixture of substantially inorganic materials obtained from processing of municipal solid waste to recover values contained therein which comprises subjecting a glass containing particulate mixture of substantially inorganic materials from the treatment of municipal solid waste including glass particles of a size up to about 10 mesh comprising glasses having the composition of from about 70 percent to about 73 percent by weight $SiO_2$, from about 11 percent to about 18 percent by weight $Na_2O$, from about 7 percent to about 17 percent by weight CaO, the balance of the composition being essentially other metal oxides, to froth flotation in a substantially sulfate ion free aqueous flotation medium with a beneficiating amount of at least one functional amine glass collector reagent, said functional amine glass collector reagent containing from about 8 carbon atoms to about 22 carbon atoms in at least one hydrocarbon group attached to a nitrogen atom to form a float fraction comprising predominantly particulate glass particles and an inorganic tailing substantially free of particulate glass particles, at least a portion of said particulate mixture of inorganic materials, exclusive of the particulate glass particles which are responsive to such a beneficiating amount of said functional amine glass collector reagent, being nonresponsive to such a beneficiating amount of said functional amine glass collector reagent to cause the particulate glass particles to concentrate in the float fraction.

8. A process as claimed in claim 7 wherein the aqueous flotation medium is made substantially sulfate ion free by subjecting the aqueous fraction medium to the action of an ion exchange column containing an anion exchange resin capable of removing sulfate ions from the aqueous flotation medium.

9. A process as claimed in claim 7 wherein the sulfate ion content of the substantially sulfate ion free aqueous flotation medium is less than about 100 ppm.

10. A continuous process for separating particulate glass particles from a substantially organics-free particulate mixture of inorganic materials formed in the treatment of municipal solid waste to recover values contained therein which comprises subjecting a substantially organics-free, glass containing particulate mixture of substantially inorganic materials including glass particles of a size between about 325 mesh and about 20 mesh comprising glasses having the composition of from about 70 percent to about 73 percent by weight $SiO_2$, from about 11 percent to about 18 percent by weight $Na_2O$, from about 7 percent to about 17 percent by weight CaO, the balance of the composition being essentially other metal oxides, to froth flotation in a substantially sulfate ion free aqueous flotation medium with a beneficiating amount of at least one functional amine glass collector reagent, said functional amine glass collector reagent containing from about 8 carbon atoms to about 22 carbon atoms in at least one hydrocarbon group attached to a nitrogen atom to form a float fraction comprising predominantly particulate glass particles and an inorganic tailing substantially free of particulate glass particles, at least a portion of said particulate mixture of inorganic materials, exclusive of the particulate glass particles which are responsive to such a beneficiating amount of said functional amine glass collector reagent, being non-responsive to such a beneficiating amount of said functional amine glass collector reagent to cause the particulate glass particles to concentrate in the float fraction.

11. A process as claimed in claim 10 wherein the aqueous flotation medium is treated to remove sulfate ion by passing the aqueous flotation medium through an ion exchange column containing an anion exchange resin capable of removing sulfate ions from the aqueous flotation medium.

12. A process as claimed in claim 10 wherein the substantially sulfate ion free aqueous flotation medium contains less than about 100 ppm sulfate ion.

* * * * *